US007006149B2

(12) United States Patent  
Satoh

(10) Patent No.: US 7,006,149 B2  
(45) Date of Patent: Feb. 28, 2006

(54) VIDEO SIGNAL CONTROL CIRCUIT

(75) Inventor: Yasunori Satoh, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 586 days.

(21) Appl. No.: 09/880,090

(22) Filed: Jun. 14, 2001

(65) Prior Publication Data

US 2002/0191106 A1 Dec. 19, 2002

(51) Int. Cl.
*H04N 7/04* (2006.01)

(52) U.S. Cl. .................................... 348/497
(58) Field of Classification Search ............... 348/497,
348/518, 519, 611, 612, 614, 616, 441; 327/136,
327/151, 161; 345/87; 382/254, 265, 275,
382/269–271, 298–300; 386/2, 13, 18–20,
386/47, 49, 85, 89–91
See application file for complete search history.

(56) References Cited

U.S. PATENT DOCUMENTS

| | | | | |
|---|---|---|---|---|
| 4,468,698 A | * | 8/1984 | Kavoussi et al. | 378/98.12 |
| 4,974,234 A | * | 11/1990 | Brandt | 375/10 |
| 4,987,491 A | * | 1/1991 | Kaite et al. | 348/497 |
| 5,034,814 A | * | 7/1991 | Watson | 375/240.01 |
| 5,132,970 A | * | 7/1992 | Urbansky | 370/102 |
| 5,146,477 A | * | 9/1992 | Cantoni et al. | 375/363 |
| 5,260,940 A | * | 11/1993 | Urbansky | 370/40 |
| 5,267,040 A | * | 11/1993 | Gosset | 348/500 |
| 5,280,345 A | * | 1/1994 | Uehara et al. | 348/498 |
| 5,331,671 A | * | 7/1994 | Urbansky | 375/118 |
| 5,359,605 A | * | 10/1994 | Urbansky et al. | 370/366 |
| 5,459,587 A | * | 10/1995 | Fukushima | 358/462 |
| 5,526,393 A | * | 6/1996 | Kondo et al. | 377/118 |
| 5,617,453 A | * | 4/1997 | Roobrouck | 375/367 |
| 5,680,415 A | * | 10/1997 | Hickman | 375/211 |
| 5,694,432 A | * | 12/1997 | Hickman | 375/295 |
| 5,710,773 A | * | 1/1998 | Shiga | 370/512 |
| 5,796,796 A | * | 8/1998 | Wang | 375/372 |
| 5,859,882 A | * | 1/1999 | Urbansky | 375/375 |
| 5,887,079 A | * | 3/1999 | Endo et al. | 382/169 |

(Continued)

FOREIGN PATENT DOCUMENTS

JP 04-109782 4/1992

(Continued)

*Primary Examiner*—Paulos M. Natnael
(74) *Attorney, Agent, or Firm*—Rabin & Berdo, PC

(57) ABSTRACT

The delay circuit composed of plural flip-flops converts an input data into plural data **110-0~110-*n* having delays of 1~n** clocks, which are inputted to the selector of the selector circuit. The counter counts the pixel number per one line of the input data, and supplies a discrete value signal indicating the counted pixel number to the judgment circuit of the selector. The judgment circuit calculates a difference between the standard pixel number and the pixel number that the discrete value signal indicates, and calculates a new delay to the delay circuit on the basis of this calculated difference. The selector outputs an output data based on the new delay calculated. With a simplified circuit configuration as above, the pixel number for each line will be regulated into the standard pixel number.

15 Claims, 10 Drawing Sheets

VIDEO SIGNAL CONTROL CIRCUIT OF THE FIRST EMBODIMENT

U.S. PATENT DOCUMENTS

| | | | |
|---|---|---|---|
| 5,923,377 A * | 7/1999 | Kenmochi et al. | 348/497 |
| 6,026,184 A * | 2/2000 | Fukushima | 382/199 |
| 6,044,122 A * | 3/2000 | Ellersick et al. | 375/360 |
| 6,052,152 A * | 4/2000 | Malcolm, Jr. et al. | 348/537 |
| 6,246,276 B1 * | 6/2001 | Arkas et al. | 327/292 |
| 6,256,003 B1 * | 7/2001 | Tsuchiya et al. | 345/87 |
| 6,256,424 B1 * | 7/2001 | Murakami | 382/260 |
| 6,380,979 B1 * | 4/2002 | Tokoi et al. | 348/458 |
| 6,404,458 B1 * | 6/2002 | Kang | 348/445 |
| 6,424,189 B1 * | 7/2002 | Su et al. | 327/141 |
| 6,556,249 B1 * | 4/2003 | Taylor et al. | 348/497 |
| 6,618,081 B1 * | 9/2003 | Harada et al. | 348/231.6 |
| 6,661,266 B1 * | 12/2003 | Variyam et al. | 327/159 |

FOREIGN PATENT DOCUMENTS

| | | |
|---|---|---|
| JP | 05-130569 | 5/1993 |
| JP | 05-207423 | 8/1993 |
| JP | 05-284532 | 10/1993 |
| JP | 08-329232 | 12/1996 |

* cited by examiner

TIMING CHART OF THE SECOND EMBODIMENT

VIDEO SIGNAL CONTROL CIRCUIT OF THE THIRD EMBODIMENT

VIDEO SIGNAL CONTROL CIRCUIT OF THE FOURTH EMBODIMENT

VIDEO SIGNAL CONTROL CIRCUIT OF THE FIFTH EMBODIMENT

OPERATION OF THE INITIAL VALUE JUDGMENT CIRCUIT

VIDEO SIGNAL CONTROL CIRCUIT

BACKGROUND OF THE INVENTION

1. Field of the Invention

The present invention relates to a video signal control circuit that, receiving a video signal obtained by decoding a composite video signal outputted from a VTR (video tape recorder) or the like, outputs to regulate the pixel number for each line of the video signal into a constant number.

2. Description of the Related Art

Generally, the video signal reproduced by a VTR contains jitters. Accordingly, the pixel number per one line of the video signal often varies in dispersion by about (1~2) from the standard pixel number (for example, the pixel number of the NTSC signal conformable to ITU-R-601 is 858 per one line).

In a video decoder, when such a video signal reproduced by a VTR (hereunder, referred to as a non-standard signal) as it stands is decoded in accordance with the horizontal synchronous signal and the vertical synchronous signal, the decoded output also contains jitters. Accordingly, a further processing of such decoded data has involved a problem that the edge of the processed image becomes uneven, or a problem that the video signal processing is failed at the subsequent stage. Therefore, in a conventional method, a decoded signal by the video decoder is temporarily written in a frame memory or the like in accordance with the horizontal synchronous signal, and a written signal is read out in accordance with a specific horizontal synchronous signal of a constant period. Thus, the pixel number per one line has been regulated into the standard pixel number.

There has been another method that regulates the pixel number per one line into a constant one, as follows. The non-standard signal is equalized on the time base by means of a PLL (phase lock loop) circuit or the like to be converted into a signal having the period of an average frequency of the non-standard signal, thus the pixel number per one line is regulated to be constant. In this method, however, the pixel number per one line can be regulated constant; but there can be a delicate discrepancy between the period of the average frequency and the period of the timing signal in the video decoder, which has created a problem. Accordingly, the signal whose pixel number per one line is made constant by using the PLL circuit or the like is temporarily written in a frame memory, etc., again. The written signal is read out in accordance with the specific horizontal synchronous signal of a constant period, thereby the pixel number per one line has been regulated into the standard pixel number.

However, in case of the method that regulates the pixel number per one line to be constant by using the foregoing frame memory, there has been a problem that the circuit configuration becomes complicated and the circuit scale becomes huge.

It is therefore an object of the present invention to provide a video signal control circuit that solves these disadvantages of the conventional technique, and regulates the pixel number per one line into a constant with a simplified circuit configuration, without using a large capacity memory such as the frame memory.

SUMMARY OF THE INVENTION

In order to accomplish the foregoing object, the video signal control circuit according to one aspect of the invention includes: a delay circuit that receives an input data, and delays the input data to thereby output as plural output signals, in which a delay of the delay circuit is selectively variable, a counter circuit that counts a pixel number of each line in the input data, and a judgment circuit that calculates a difference between a set standard pixel number and the pixel number counted by the counter circuit, and calculates a new delay in accordance with the delay set by the delay circuit and the delay on the basis of the calculated difference, in which the delay circuit delays the input signal by the delay selected on the basis of the delay calculated by the judgment circuit.

Further, the video signal control circuit according to another aspect of the invention includes: a memory circuit which an input data can be written in and read from, which has two one-port memories, in which the input data are alternately written in the two one-port memories, and the written input data are alternately read from the two one-port memories, an address generation circuit that outputs a write address or a read address to the memory circuit, a counter circuit that counts a pixel number of each line in the input data, and a judgment circuit that calculates a difference between a set standard pixel number and the pixel number counted by the counter circuit, and calculates a new address value in accordance with an address value generated by the address generation circuit and a delay based on the calculated difference, in which the address generation circuit generates the write address signal or the read address signal on the basis of the address value calculated by the judgment circuit, and when there is a difference between the pixel number of the input data read from the one-port memory and that of the input data written in the one-port memory, some of the plural read addresses each corresponding to the plural data to be read are repeated or deleted, in accordance with the difference between the pixel numbers.

Further, the video signal control circuit according to another aspect of the invention includes: a memory circuit containing a two-port memory that is able to write in and read out an input data in parallel, an address generation circuit that outputs a write address or a read address to the memory circuit, a counter circuit that counts a pixel number of each line in the input data, and a judgment circuit that calculates a difference between a set standard pixel number and the pixel number counted by the counter circuit, and calculates a new address value in accordance with an address value generated by the address generation circuit and a delay based on the calculated difference, in which the address generation circuit generates the write address signal or the read address signal on the basis of the address value calculated by the judgment circuit, and when there is a difference between the pixel number of the input data read from the memory circuit and that of the input data written in the memory circuit, some of the plural read addresses each corresponding to the plural data to be read are repeated or deleted, in accordance with the difference between the pixel numbers.

DESCRIPTION OF THE PREFERRED EMBODIMENTS

The video signal control circuit of the invention will be described with reference to the accompanying drawings.

The video signal control circuit in the first embodiment of the invention passes an input signal through delay elements, generates plural data whose delays are different each other by one clock (by one data), selects a specified data out of the plural data in accordance with the pixel number per one line, and thereby regulates the pixel number per one line into a constant. This video signal control circuit is suitable for regulating the pixel number per one line of a component signal into a constant, in the video decoder that applies the YC separation processing, luminance signal processing, color-difference processing, synchronous signal processing, etc., to a composite video signal outputted from a VTR, of which pixel number per one line is irregular, and outputs the component signal.

Figure 1:
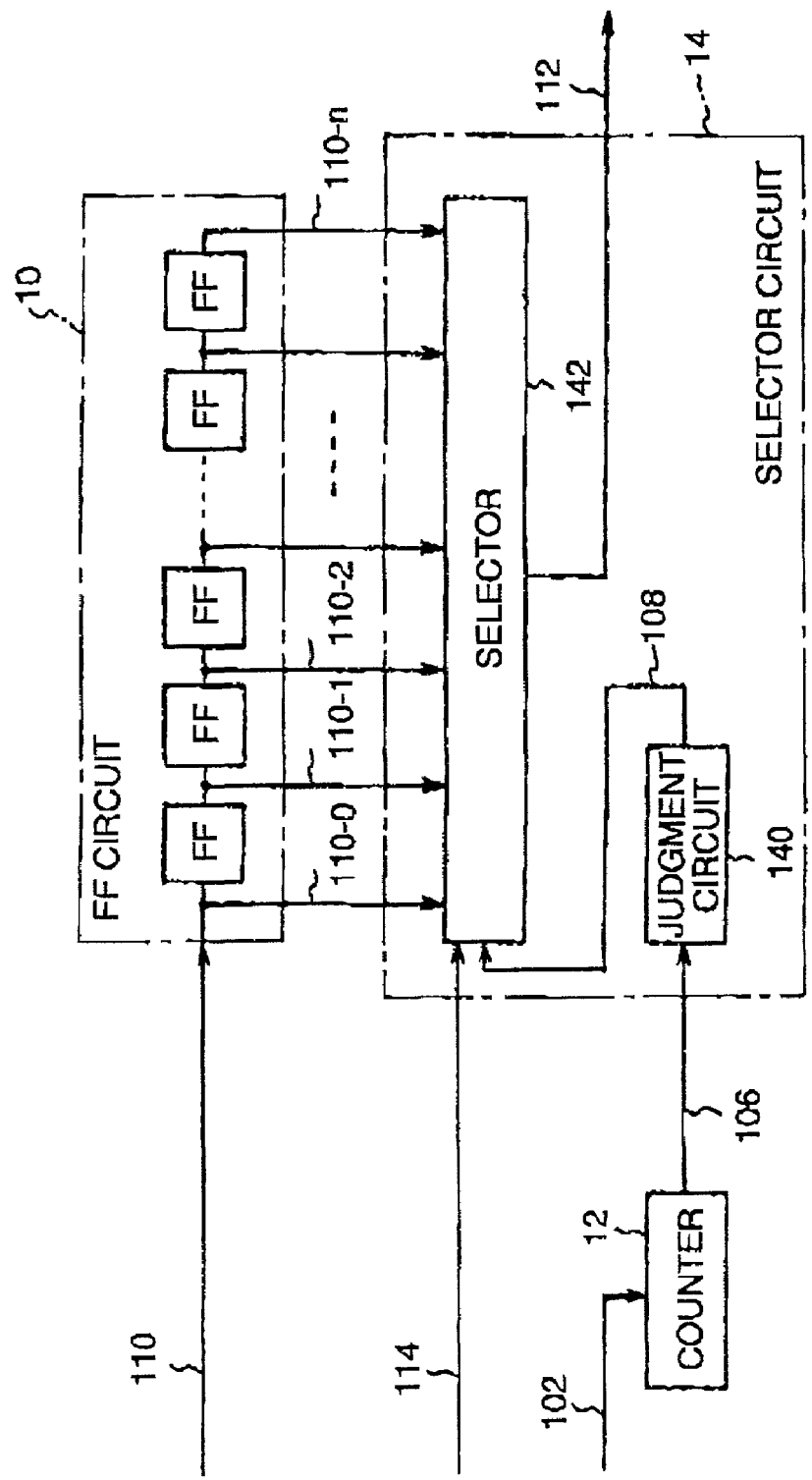
FIG. 1 is a block diagram of a video signal control circuit in the first embodiment of the invention.

FIG. 1 is a block diagram that illustrates the first embodiment. In FIG. 1, a delay circuit 10 receives an input data 100 being the component signal decoded by a video decoder, whose pixel number per one line is uneven (hereunder referred to as the non-standard signal). The delay circuit 10 passes the input data 100 through the delay elements to thereby generate plural data whose delays are different each other by one clock. As an example, the delay circuit 10 is configured with n-stage flip-flops (FF). The delay circuit 10 sequentially transfers the input data 100 through the n-stage FF in accordance with a system clock 104 (not illustrated) of the video decoder. Thereby, the delay circuit 10 gives the delay by one clock to each FF stage, and generates data 110-0~110-n each having a different delay by one clock. The input of the delay circuit 10 (hereunder, referred to as the FF circuit) and the outputs of each FF are each connected to a selector circuit 14, so that the data 110-0~110-n are inputted to the selector circuit 14.

Further, the number of the FF stages is determined depending on the number of dispersed pixels that is intended to absorb. For example, the number of the effective scanning lines for one frame in the NTSC system television signal is about 420 (about 210 for one field). Thus, assuming that the pixel number of all the scanning lines for one screen scatters by one pixel from the standard pixel number, if all the pixel dispersions are intended to be absorbed, it will require a 210-stage FF circuits.

A counter 12 counts the pixel number per one line of the input data 100. Concretely, the counter 12 is reset by a horizontal synchronous signal 102 from the video decoder to start counting the clock 104. The counter 12 counts the number of the clock 104 that is inputted during the period of one line to generate a discrete value signal 106. Here, the clock 104 synchronizes with the input data 100, and each of the input data 100 corresponds to one pixel. Therefore, the counted number of clocks represents the pixel number of one line. The output of the counter 12 is connected to the selector circuit 14, so that the discrete value signal 106 is inputted to the selector circuit 14.

The selector circuit 14 includes a judgment circuit 140 and a selector 142. The selector circuit 14 inputs the discrete value signal 106 to the judgment circuit 140, and inputs the data 110-0~110-n from the FF circuit 10 to the selector 142.

The judgment circuit 140 possesses a memory A that stores, for example, the standard pixel number per one line (for example, 858) and a register B that holds the delays (0~n clocks) of the data now being selected by the selector 142. Here, the delays correspond to the delays (0~n clocks) of the data 110-0~110-n. The register B may be designed to hold the data number (110-0~110-n) in replacement of the delay.

The judgment circuit 140, receiving the discrete value signal 106 from the counter 12, subtracts the pixel number indicated by the discrete value signal 106 from the standard pixel number held by the memory A, and calculates the difference. When the delay corresponding to the calculated difference, for example, the difference is $\alpha$, $\alpha$ clock is added to the delay held by the register B, so that the content of the register B is updated by the added value. The judgment circuit 140 generates a control signal 108 indicating the delay after updated, and delivers it to the selector 142.

The selector 142 selects the data having the delay that the control signal 108 from the judgment circuit 140 indicates out of the data 110-0~110-n inputted from the FF circuit 10, and outputs the result as an output data 112. Thus, the FF circuit 10 and the selector 14 configures a circuit that gives the input data 100 an arbitrary delay from 0 clock to n clock. Here, which one of the data 110-0~110-n is selected at the start of the operation is determined by the frequency with which the line of a smaller pixel number is inputted and the frequency with which the line of a larger pixel number is inputted. In this embodiment, a data number (n/2) is initialized in the register B of the judgment circuit 140 so as to select the data 110-(n/2) having the delay of n/2 clocks. Further, a vertical synchronous signal 114 is inputted to the reset terminal of the selector 142, so that the selector 142 is initialized each field by this vertical synchronous signal 114. Accompanied with this initialization, the delay of the FF circuit 10 is returned to the initial setting.

Next, the operation of the video signal control circuit as shown in FIG. 1 will be described. The input data 100 is converted by the FF circuit 10 into the data 110-0~110-n whose delays are 0~n clocks, which are inputted to the selector 142 of the selector circuit 14. On the other hand, the counter 12 generates the discrete value signal 106 indicating the pixel number per one line, which is supplied to the judgment circuit 140 of the selector circuit 14. The discrete value signal 106 is outputted each line.

The judgment circuit 140 generates the control signal 108 indicating the delay initialized in the register B, which is supplied to the selector 142. When receiving the discrete value signal 106, the judgment circuit 140 subtracts the pixel number that the discrete value signal 106 indicates from the standard pixel number to calculate the difference. The judgment circuit 140 adds the delay corresponding to the calculated difference and the delay held in the register B, and updates the content of the register B by the added value. Further, the judgment circuit 140 generates the control signal 108 indicating the delay after updated, which is supplied to the selector 142. The selector 142 selects the data having the delay indicated by this control signal 108 out of the data 110-0~110-n, and outputs the result as the output data 112.

Figure 2:
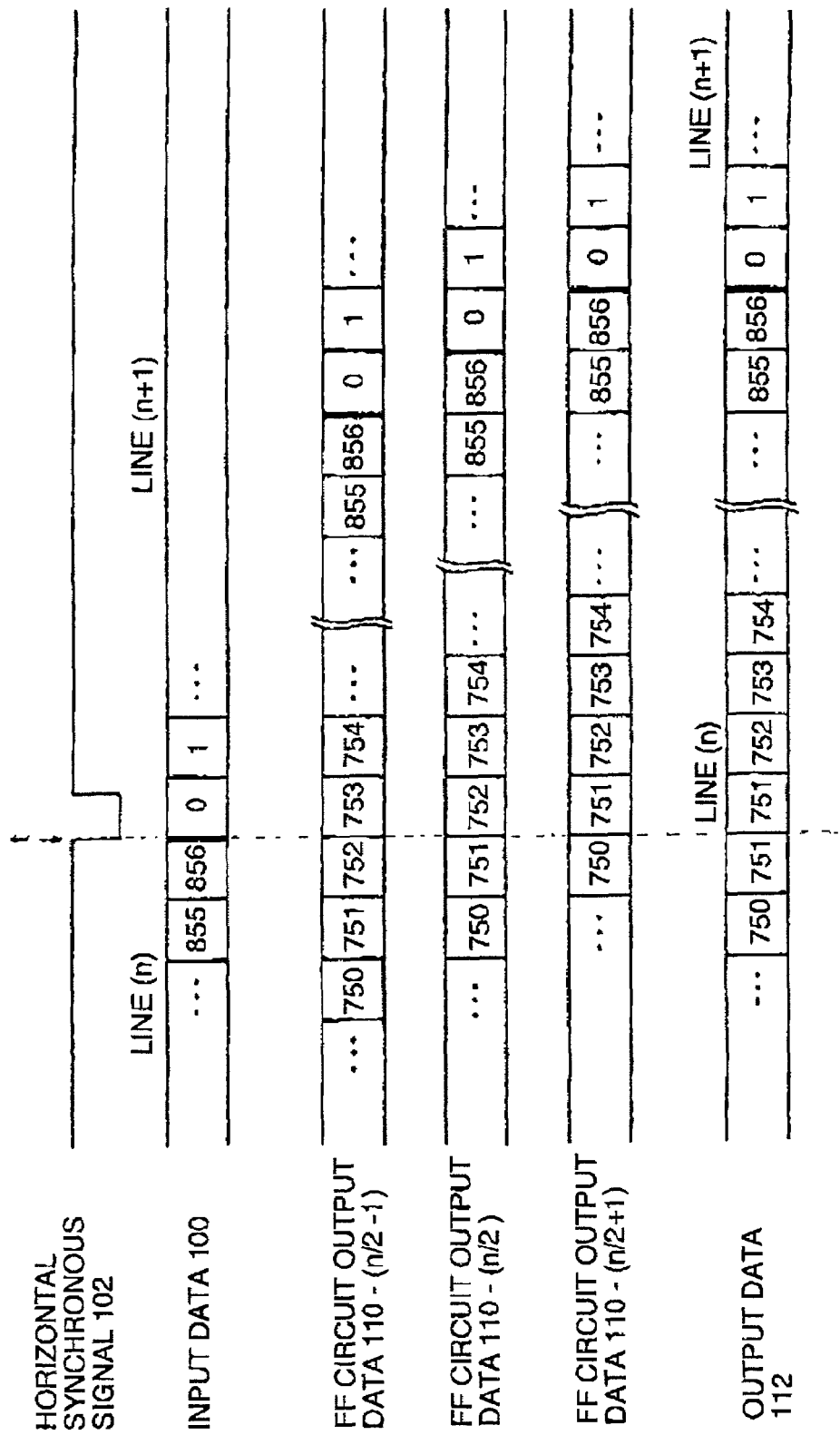
FIG. 2 is a timing chart to illustrate the operation in the video signal control circuit in FIG. 1, in case of a line with the pixel number less than the standard pixel number being inputted.

As shown in FIG. 2, in a case that the line (n) composed of data 0~856 (857 pixels) is inputted, and the FF circuit 10 is configured with flip-flops of 210 stages, when the horizontal synchronous signal 102 is inputted at time t, the last data 856 of the line (n) is inputted to the FF circuit 10. Accordingly, data 752, 751, 750 are outputted as the data 110-(n/2-1), 110-(n/2), 110-(n/2+1) to the selector circuit 14.

In the judgment circuit 140 of the selector circuit 14, the difference between the standard pixel number and the pixel number indicated by the discrete value signal 106 is +1 in this case. Assuming that the register B holds the delay (n/2) at this moment, the judgment circuit 140 updates the content of the register B into (n/2)+1, and outputs to generate the control signal 108 indicating the delay (n/2)+1. The selector 142 selects at time t the data 110-(n/2+1) having the delay (n/2)+1 that the control signal 108 indicates, and outputs the data 110-(n/2+1) as the data 112. Here, the data 110-(n/2+1) is delayed by one clock from the data 110-(n/2). Therefore, as shown in FIG. 2, the data is added one data next to a last data of the line, so that the pixel number per one line is regulated from 857 into the standard pixel number 858.

Figure 3:
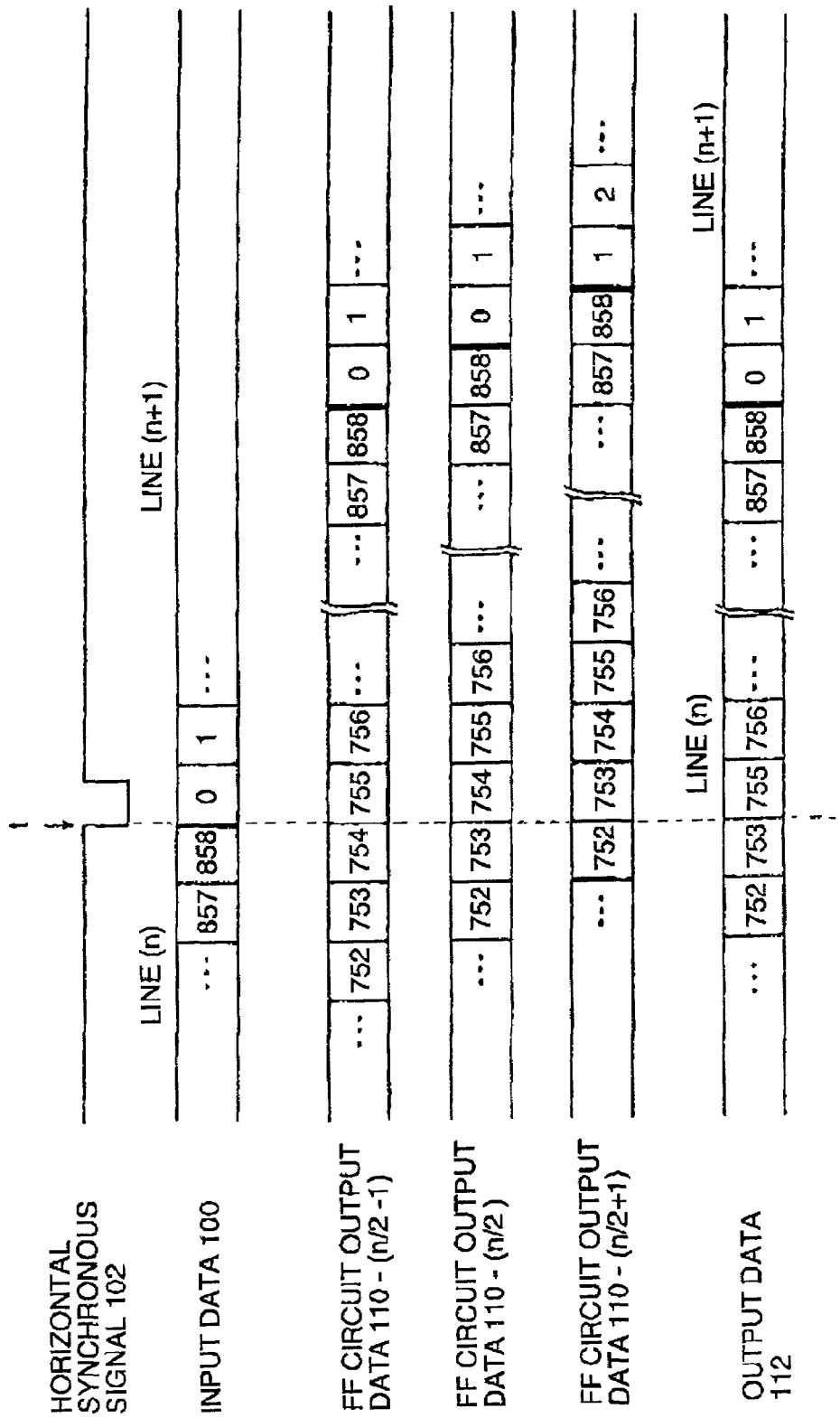
FIG. 3 is a timing chart to illustrate the operation in the video signal control circuit in FIG. 1, in case of a line with the pixel number more than the standard pixel number being inputted.

Also as shown in FIG. 3, in a case that the line (n) composed of data 0~858 (859 pixels) is inputted, and the FF circuit 10 is configured with the flip-flops of 210 stages, when the horizontal synchronous signal 102 is inputted at time t, the last data 858 of the line (n) is inputted to the FF circuit 10. Accordingly, data 754, 753, 752 are outputted as the data 110-(n/2-1), 110-(n/2), 110-(n/2+1) to the selector circuit 14.

In the judgment circuit 140 of the selector circuit 14, the difference between the standard pixel number and the pixel number indicated by the discrete value signal 106 is -1 in this case. Assuming that the register B holds the delay (n/2) at this moment, the judgment circuit 140 updates the content of the register B into (n/2)-1, and outputs to generate the control signal 108 indicating the delay (n/2)-1. The selector 142 selects at time t the data 110-(n/2-1) having the delay (n/2)-1 that the control signal 108 indicates, and outputs the data 110-(n/2-1) as the data 112. Here, the data 110-(n/2-1) is advanced by one clock from the data 110-(n/2). Therefore, as shown in FIG. 3, the last data of the line is deleted from the line, so that the pixel number per one line is regulated from 859 into the standard pixel number 858.

Further, in case that the lines whose pixel number per one line is different from the standard pixel number are continuously inputted, when the pixel number per one line is smaller than the standard pixel number, the delay of the data selected by the selector 142 becomes gradually larger. In reverse, when the pixel number per one line is larger than the standard pixel number, the delay of the data selected by the selector 142 becomes gradually smaller.

Therefore, the extent where the pixel dispersion can be absorbed depends upon the number n of the FF stages in the FF circuit 10, whereby the maximum delay of the data generated by the FF circuit 10 is determined. Further, the foregoing processing is initialized each field by the vertical synchronous signal 114, the delay of the FF circuit 10 is returned to the initial setting.

Further, in the examples of FIG. 2 and FIG. 3, the selection of the data is executed in the selector 142. Since generally the pixel dispersion is about 1~2 pixels in this case, the data selection may be executed by, for example, the data prior by two from the last data. In this case, the switching of the data is executed within the so-called blanking period.

Thus, according to the first embodiment, even when the pixel number per one line is dispersed from the standard pixel number, the pixel number can be regulated to be equal to the standard pixel number, so that the data of the constant period can be outputted.

The video signal control circuit in the second embodiment of the invention writes the input data into two one-port memories alternately, reads the written data alternately at the timing corresponding to the pixel number per one line, and thereby regulates the pixel number per one line into a constant.

Figure 4:
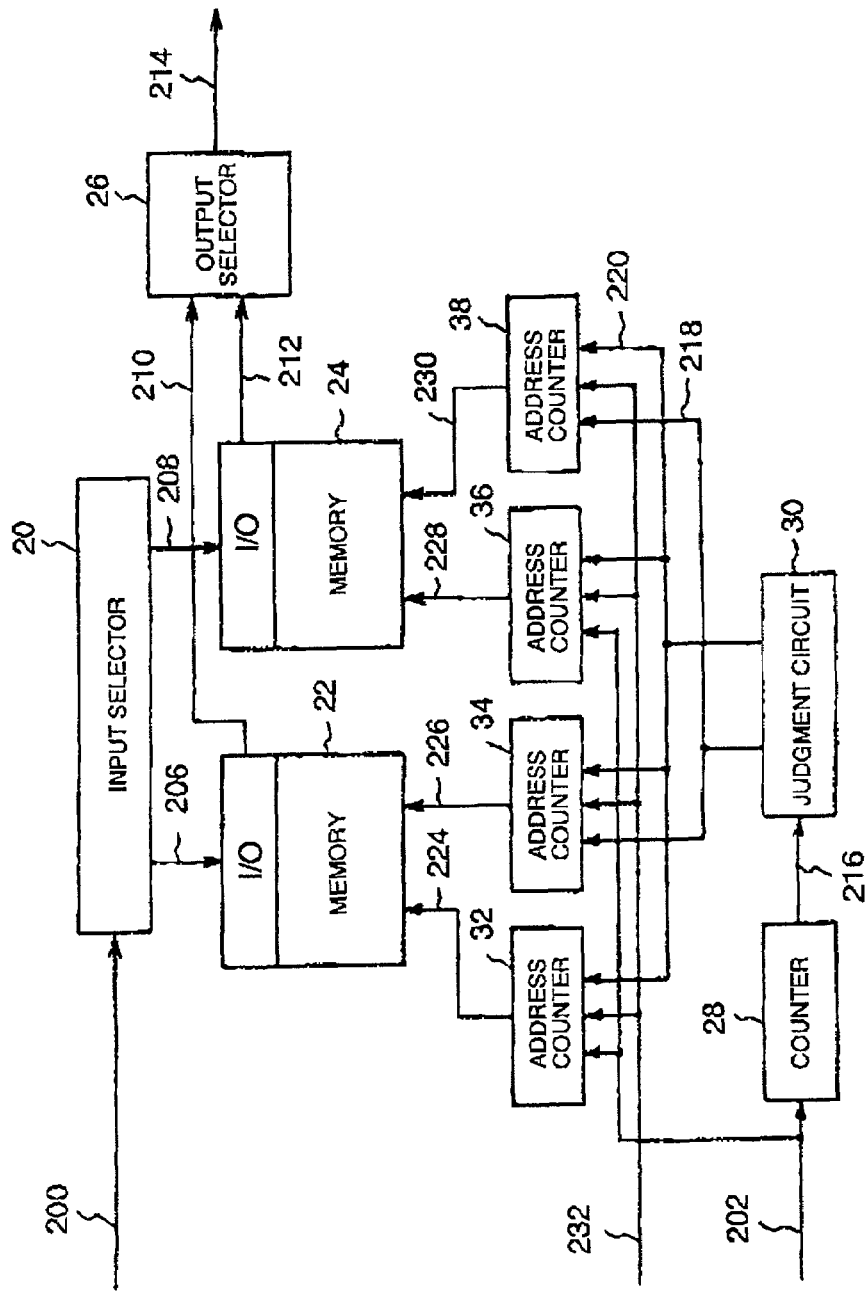
FIG. 4 is a block diagram of a video signal control circuit in the second embodiment of the invention.

FIG. 4 is a block diagram that illustrates the second embodiment. In FIG. 4, to an input selector 20 is inputted the non-standard signal as an input data 200. The input selector 20 divides the input data 200 into data 206 and data 208 each specific number of data in accordance with a control signal 222 (not illustrated) supplied by a judgment circuit 30. The input selector 20 has a memory 22 and a memory 24 connected, and the data 206, 208 are inputted to the memories 22, 24, respectively.

The memories 22, 24 are one-port memories that can temporarily store n-word data. The memories 22, 24 writes the data 206, 208 inputted through built-in I/O sections in accordance with write address signals 224, 228 supplied by address counters 32, 36. Further, the memories 22, 24 reads the written data in accordance with read address signals 226, 230 supplied by address counters 34, 38, and outputs the data from the I/O sections as the data 210, 212. Furthermore, in this embodiment, the memories 22, 24 alternately execute the writing and reading of the data. That is, when the memory 22 executes the writing, the memory 24 executes the reading, and when the memory 22 executes the reading, the memory 24 executes the writing. To the memories 22, 24 is connected an output selector 26. The data 210, 212 are inputted to the output selector 26.

The output selector 26 selects the data 210, 212 from the memories 22, 24 in accordance with the control signal 222 supplied by the judgment circuit 30. The output selector 26 outputs the selected data as an output data 214. A counter 28 counts the pixel number for one line by counting the number of a clock 204 (not illustrated) inputted within the period of one line, which is the same as the counter in FIG. 1. The counter 28 generates a discrete value signal 216 indicating the pixel number that it counted. The counter 28 has the judgment circuit 30 connected. The discrete value signal 216 is inputted to the judgment circuit 30.

The judgment circuit 30 generates control signals that control the operations of the address counters 32~38, input selector 20, output selector 26. Concretely, the judgment circuit 30 incorporates, for example, a memory 300, a counter circuit 302, a register 304, and a period setting circuit 306. The judgment circuit 30 counts the clock 204 by means of the counter circuit 304 to thereby generate a control signal 220 that repeats "1", "0" each period T held in the register 304. Here in this embodiment, the period T represents one clock as a unit, and the address signal is generated each clock; and accordingly, the value of the period T becomes equal to the address count that the address signal indicates.

The judgment circuit 30, receiving the discrete value signal 216, subtracts the pixel number indicated by the discrete value signal 216 from the standard pixel number (for example, 858) beforehand stored in the memory 300, and calculates the difference. The judgment circuit 30 generates a difference signal 218 that indicates the calculated difference. The period setting circuit 306 adds the period T that the register 304 holds and the difference that the difference signal 218 indicates, and when the control signal 220 next changes the value from "1" to "0", or from "0" to "1", the judgment circuit 30 updates the period T that the register 304 holds by the added value. Therefore, the period T of the control signal 220 is extended by a clock from the current period T when the difference indicated by the difference signal 218 is +a, and it is shortened by b clock from the current period T when the difference is –b.

The initial value of the period T at the start of operation is determined by the frequency with which the line of a smaller pixel number is inputted and the frequency with which the line of a larger pixel number is inputted. However in this embodiment, assuming that both the frequencies are the same, the initial value of the period T is set to a length equivalent to n/2 clocks. To the judgment circuit 30 are connected the address counters 32~38, input selector 20, and output selector 26. The difference signal 218 generated by the judgment circuit 30 is supplied to the address counters 34, 38, the control signal 220 is supplied to the address counters 32~38, and the control signal 222 is supplied to the input selector 20 and the output selector 26.

The address counter 32 counts the input counts of the clock 204, when the control signal 220 supplied by the judgment circuit 30 is "1". On the basis of the counted value, the address counter 32 generates the write address signal 224 that indicates each clock sequentially the position where the data are written in the memory 22, for example, address 0 to address N. Further, the address counter 32 gives the address counter 34 an address x generated at the moment when a horizontal synchronous signal 202 is inputted. This address X corresponds to an address where the last data of one line is written. In the same manner, the address counter 36 also generates the write address signal 228 when the control signal 220 is "0", supplies it to the memory 24, and generates the address X to supply to the address counter 38.

The address counter 34 incorporates, for example, a counter 340, address generation circuit 342, and counter control circuit 344. The address counter 34 counts the clock 204 by means of the counter 340, when the control signal 220 supplied by the judgment circuit 30 is "0". On the basis of the counted value, the address counter 34 generates, by means of the address generation circuit 342, the read address signal 226 that indicates each clock sequentially the position where the data are read from the memory 22, for example, address 0 to address N. However, in case the address X is supplied by the address counter 32, at the moment that the address indicated by the read address signal 226 reaches an address Y (X), the address counter 34 controls the operation of the counter 340 by means of the counter control circuit 344, on the basis of the value that the difference signal 218 from the judgment circuit 30 indicates.

Concretely, the counter control circuit 344 does not executes the control of the counter 340, when the difference signal 218 indicates "0". However, when the difference signal 218 indicates +a, the counter control circuit 344 controls the operation of the counter 340 in such a manner that the read address signal 226 repeats the same address a times; and when the difference signal 218 indicates –b, the counter control circuit 344 controls the operation of the counter 340 so as to delete b addresses. In the same manner, the address counter 38 also generates the read address signal 230, when the control signal 220 is "1".

Further, a vertical synchronous signal 232 is inputted to the reset terminals of the address counters 32, 34, 36, 38. The address counters 32, 34, 36, 38 are reset each field by this vertical synchronous signal 232. The address counters 32, 34 are connected to the memory 22, and the address counters 36, 38 are connected to the memory 24. Accordingly, the write address signal 224 and the read address signal 226 are supplied to the memory 22, and the write address signal 228 and the read address signal 230 are supplied to the memory 24.

The memories 22, 24 sequentially read the data written in address 0 to address N, in accordance with the read address signals 226, 230. However, when the read address signals 226, 230 repeatedly designate the same address, the memories 22, 24 repeatedly read the same data, thereby increasing the number of data per one line. In reverse, when the read address signals 226, 230 delete a part of the addresses, the memories 22, 24 do not read the data of the deleted addresses, thereby decreasing the number of the data per one line. In this embodiment, this processing regulates the pixel number per one line into the standard pixel number.

Next, the operation of the video signal control circuit as shown in FIG. 4 will be described. Here, it is assumed that the capacity of the memory 22 is 210 words, the data write position is address 0 to address 209, and the memory 300 of the judgment circuit 30 stores 858 as the standard pixel number in advance. The counter 28 generates the discrete value signal 216 indicating the pixel number per one line, each time the horizontal synchronous signal 202 is inputted, and outputs the discrete value signal 216 to the judgment circuit 30.

The judgment circuit 30 generates the control signal 220 that repeats "1", "0" each period T held in the register 304. And, when the discrete value signal 216 is inputted, the judgment circuit 30 calculates the difference between the standard pixel number that the memory 300 holds and the pixel number that the discrete value signal 216 indicates. The judgment circuit 30 adds the calculated difference to the period T held in the register 304, and updates the content of the register 304 by the added value.

Therefore, when the difference is not 0, the period T held in the register 304 is updated, and the period T of the control signals 220, 222 becomes long or short in accordance with the difference.

The address counter 32 generates the write address signal 224 that specifies each clock sequentially, for example, address 0 to address N, when the control signal 220 from the judgment circuit 30 is "1".

Therefore, the address N varies as a rule in accordance with the length of the period T of the control signal 220. For example, if the period T becomes long, the address N will become large, and the number of the addresses that the write address signal 224 specifies will increase. In reverse, if the period T becomes short, the address N will become small, and the number of the addresses that the write address signal 224 specifies will decrease. In the same manner, the address counter 36 generates the write address signal 228.

The address counters 34, 38 generate the read address signals 226, 230 that designate each clock sequentially, for example, address 0 to address N, in the same manner as the address counters 32, 36. The address signals 224~230 are supplied to the memories 22, 24.

On the other hand, the input selector 20 outputs the input data 200 as the data 206 to the memory 22, when the control signal 222 supplied by the judgment circuit 30 is "1", and outputs as the data 208 to the memory 24, when the control signal 222 is "0". Since the control signal 222 repeats "1", "0" each period T, the input data 200 is divided into the memories 22 and 24 each period T.

The memories 22, 24 sequentially write the data 206, 208 from the input selector 20 in address 0 to address N in accordance with the write address signals 224, 228 from the address counters 32, 36. The memories 22, 24 sequentially read out the written data in accordance with the read address signals 226, 230 from the address counters 34, 38, and outputs the data as the data 210, 212 to the output selector 26. The output selector 26 selects the data 210, 212 alternately in accordance with the control signal 222 from the judgment circuit 30 to output as the data 214.

Figure 5:
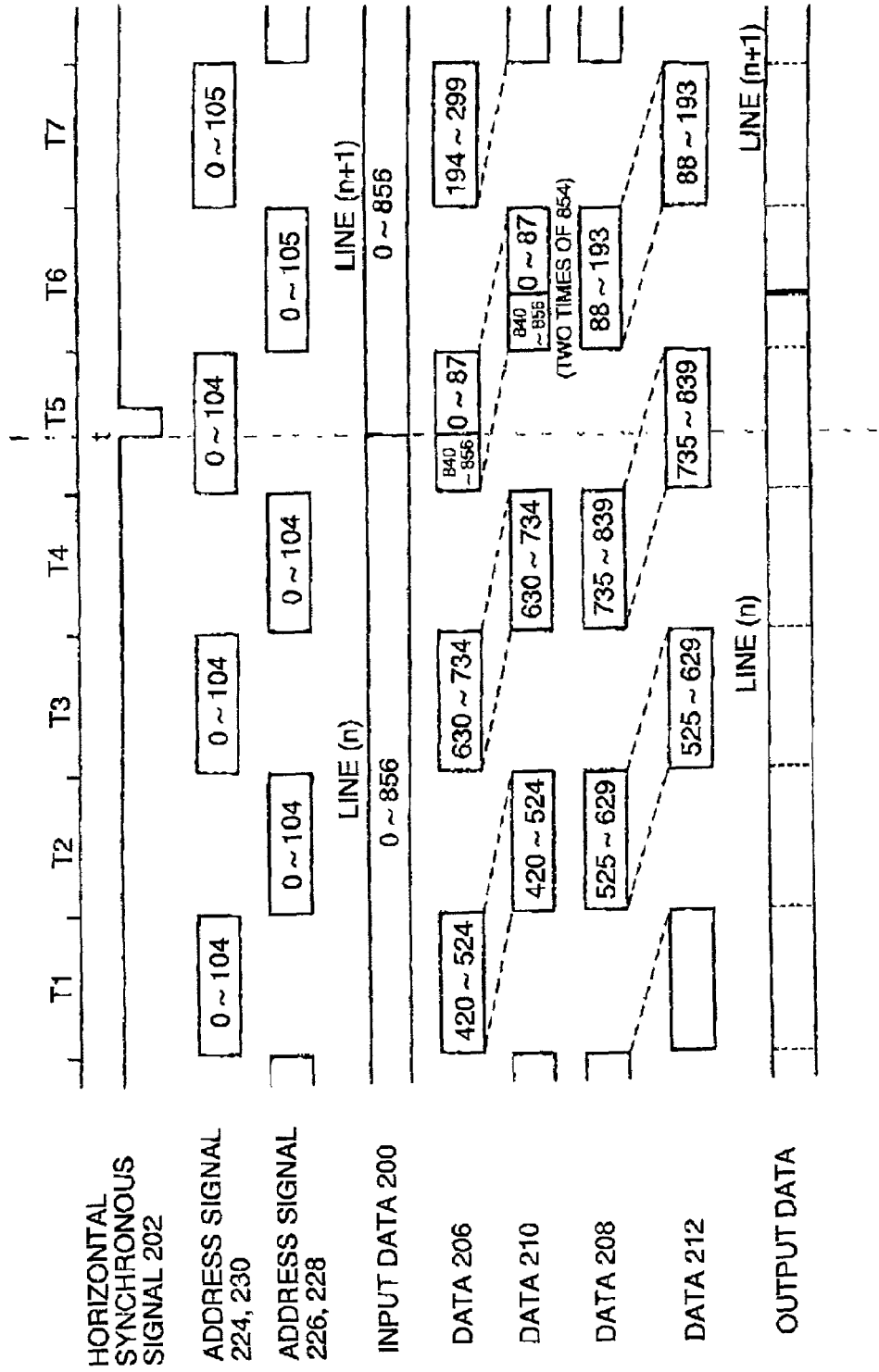
FIG. 5 is a timing chart to illustrate the operation in the video signal control circuit in FIG. 4.

As shown in FIG. 5, for example, when the data of the line (n) composed of 0~856 (857) pixels is inputted, during the period T2, data 420~524 of the line (n) that are written during the period T1 in address 0~address 104 of the memory 22 are read out in accordance with the read address signal 226. At the same time of this readout, data 525~629 are written in address 0~address 104 of the memory 24 in accordance with the write address signal 228. During the period T3, data 630~734 are written in address 0~address 104 of the memory 22 in accordance with the write address signal 224. At the same time of this write, data 525~629 that are written during the period T2 in address 0~address 104 of the memory 24 are read out in accordance with the read address signal 230. Also, during the period T4, T5, the data write and the data read are executed in the same manner.

However, when the horizontal synchronous signal 202 is inputted at time t in the period T5, the judgment circuit 30 subtracts the pixel number 857 of the line (n) counted by the counter 28 from the standard pixel number 858 to calculate the difference. The judgment circuit 30 controls the period T of the control signal 220 on the basis of the difference calculated. In this case, since the difference is +1, the period T of the control signal 220 is elongated by one clock from the period T6. Thereby, in the address counters 32~38 are generated the address signals 224~230 that sequentially specify addresses 0~105. The address signals 224~230 are supplied to the memories 22, 24.

However, when the address counter 32 is supplied with the horizontal synchronous signal 202 at time t in the period T5, the address counter 32 supplies the address counter 34 with the address X=16 of the write address signal 224 generated at that moment. When supplied with the address X, the address counter 34 is supplied with the difference signal 218 indicating +1 by the judgment circuit 30. Accordingly, when the address Y(X) is generated as the read address signal 226, the address Y is generated consecutively one more time during the period T6, and the addresses are generated sequentially from the address (Y+1) and after. In FIG. 5, Y is set at (X−2). Thereby, the repetition and deletion of data can be performed in the so-called blanking period.

Therefore, out of data 840~856 of the line (n) and data 0~87 of the line (n+1) that have been written in the memory 20 during the period T5 shown in FIG. 5, data 854 of the address Y=14 is read out twice during the period T6. Consequently, the pixel number (number of data) of the line (n) is increased by one pixel, and regulated into the standard pixel number. Thus, since the data written during the period T5 are all read out and one of them is repeatedly read (read twice), the period T6 is set longer by one address, and the period of that length continues thereafter.

In the example of FIG. 5, the line whose pixel number per one line is smaller than the standard pixel number is inputted. When the line whose pixel number per one line is larger than the standard pixel number is inputted, the data are read from the memory with the data of part of the addresses deleted, thus regulating the pixel number into the standard. When the line having a smaller pixel number is continuously inputted, the number of data that are written in and read from the memories 22, 24 increases gradually. In reverse, when the line having a larger pixel number is continuously inputted, the number of data that are written in and read from the memories 22, 24 decreases gradually. The address counters 32, 34, 36, 38 are initialized each field by the vertical synchronous signal 232. Accompanied with this initialization, the addresses supplied to the memories 22, 24 are returned each field to the initial set values.

Thus, according to the second embodiment, even when the pixel number per one line is dispersed from the standard pixel number, the pixel number can be regulated to be equal to the standard pixel number, so that the data of the constant period can be outputted. Further, since the memories 22, 24 are employed in replacement of the FF circuit 10 in the first embodiment, the number of the circuit elements can be reduced, the chip size when integrating the circuits into an LSI can be reduced, and the lower power consumption can be achieved.

The third embodiment of the invention employs one two-port memory instead of the memories 22, 24 in the second embodiment. In the video signal control circuit of the third embodiment, the input data are sequentially written in this two-port memory, the written data are read out at the timing corresponding to the pixel number per one line, and thereby the pixel number per one line is regulated to be constant.

Figure 6:
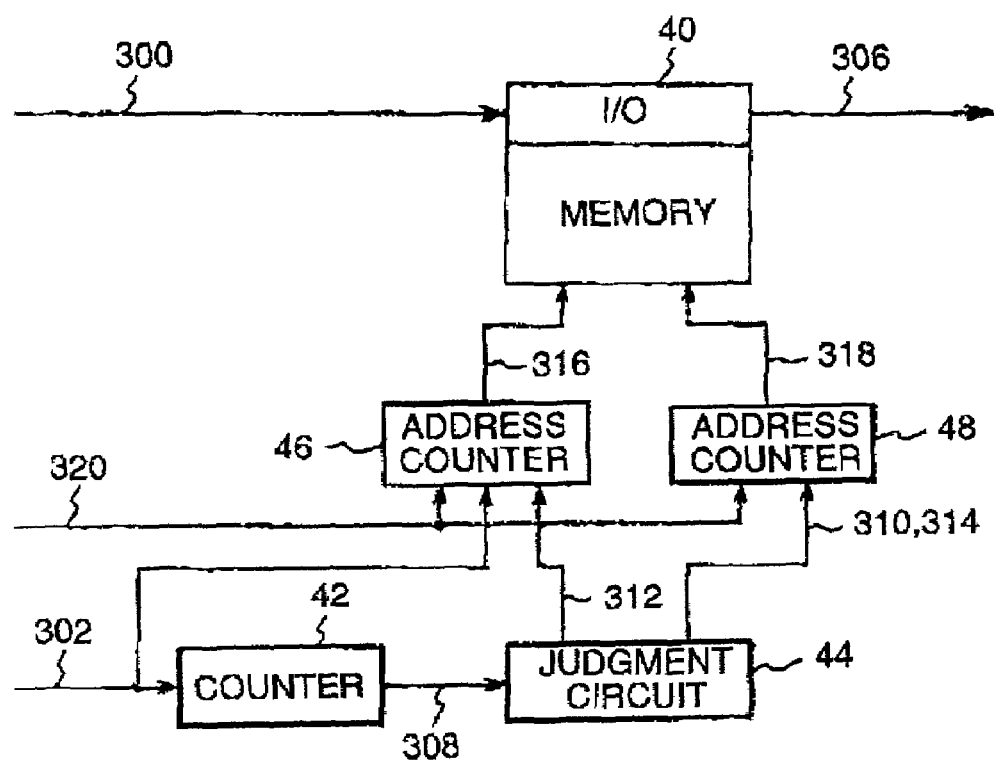
FIG. 6 is a block diagram of a video signal control circuit in the third embodiment of the invention.

FIG. 6 is a block diagram that illustrates the third embodiment. In FIG. 6, the non-standard signal is inputted to a memory 40 as an input data 300.

The memory 40 is the two-port memory that can store data of n-words temporarily. The memory 40 writes the data 300 inputted through a built-in I/O section in accordance with a write address signal 316 supplied by an address counter 46. The memory 40 reads the written data in accordance with a read address signal 318 supplied by an address counter 48, and outputs the data as an output data 306 from the I/O section. The memory 40 executes the writing and reading of data in parallel.

A counter 42 counts, in the same manner as the counter 12 shown in FIG. 1, the number of a clock 304 inputted during the period of one line from the video decoder to thereby count the pixel number per one line. The counter 42 generates a discrete value signal 308 indicating the pixel number counted. The output of the counter 42 is connected to a judgment circuit 44. The discrete value signal 308 generated by the counter 42 is inputted to the judgment circuit 44 accordingly.

The judgment circuit 44 generates control signals that control the operations of the address counters 46, 48. Concretely, the judgment circuit 44 incorporates, for example, a memory 440, a counter circuit 442, a register 444, and a period setting circuit 446. The judgment circuit 44 counts the clock 302 by means of the counter circuit 442 to thereby generate a control signal 312 that repeats "1", "0" each period T held in the register 444. Further, the judgment circuit 44 generates a control signal 314 that is delayed by T0 from the control signal 312. Here in this embodiment, the period T represents one clock as a unit, and the address signal is generated each clock; and accordingly, the value of the period T becomes equal to the address count that the address signal indicates.

The judgment circuit 44, receiving the discrete value signal 308, subtracts the pixel number indicated by the discrete value signal 308 from the standard pixel number beforehand stored in the memory 440, and calculates the difference. The judgment circuit 44 generates a difference signal 310 that indicates the calculated difference. The period setting circuit 446 adds the period T that the register 444 holds and the difference that the difference signal 310 indicates, and when the control signals 312, 314 next change the value from "1" to "0", or from "0" to "1", the judgment circuit 44 updates the period T that the register 444 holds by the added value. Therefore, the period T of the control signals 312, 314 is elongated or shortened depending upon the difference that the difference signal 310 indicates.

In this embodiment, the initial value of T0 is set to T/2. The initial value of the period T is determined by the frequency with which the line of a smaller pixel number is inputted and the frequency with which the line of a larger pixel number is inputted. However, in this embodiment, the initial value of the period T is set to a length equivalent to n/2 clocks, assuming both the frequencies as equal. The judgment circuit 44 has the address counters 46, 48 connected. The control signal 312 generated by the judgment circuit 44 is supplied to the address counter 46, and both the difference signal 310 and the control signal 314 are supplied to the address counter 48.

The address counter 46 generates, in the same manner as the address counter 32 shown in FIG. 4, the write address signal 316 that specifies sequentially each clock, for example, address 0 to address N on the basis of the control signal 312. When supplied with a horizontal synchronous signal 302, the address counter 46 supplies the address counter 48 with the address X. This address X corresponds to an address where the last data of one line is written.

The address counter 48 generates, in the same manner as the address counter 34 shown in FIG. 4, the read address signal 318 that specifies each clock sequentially, for example, address 0 to address N on the basis of the control signal 314. However, in case the address X is supplied by the address counter 46, at the moment that the address of the read address signal 318 reaches the address Y (X), when the difference signal 308 from the counter 42 indicates +a, the same address is repeated a times. And, when the difference signal 308 indicates −b, the read address signal 318 with b addresses deleted is generated.

Further, a vertical synchronous signal 320 is inputted to the reset terminals of the address counters 46, 48. The address counters 46, 48 are reset each field by this vertical synchronous signal 320. The address counters 46, 48 are connected to the memory 40, and the address signals 316, 318 are supplied to the memory 40.

The memory 40 writes the input data 300 sequentially in accordance with the write address signal 316. And, the memory 40 reads the written data sequentially in accordance with the read address signal 318. Therefore, when the read address signal 318 repeats the same address, the same data is repeatedly read, and the number of data per one line increases accordingly. In reverse, when part of the addresses are deleted, the number of data per one line decreases. This processing regulates the pixel number per one line into the standard pixel number.

Next, the operation of the video signal control circuit shown in FIG. 6 will be described. Here, it is assumed that the capacity of the memory 40 is 210 words, the data write position is address 0 to address 209, and the memory 440 of the judgment circuit 44 stores the standard pixel number (858) in advance. The counter 42 generates the discrete value signal 308 indicating the pixel number per one line, each time the horizontal synchronous signal 302 is inputted, and outputs the discrete value signal 308 to the judgment circuit 44.

The judgment circuit 44 generates the control signal 312 that repeats "1", "0" each period T held in the register 444, and the control signal 314 that is delayed by T0 from the control signal 312. And, when the discrete value signal 308 is inputted, the judgment circuit 44 subtracts the pixel number that the discrete value signal 308 indicates from the standard pixel number that the memory 440 holds to calculate the difference. The judgment circuit 44 adds the calculated difference to the period T held in the register 444, and updates the content of the register 444 by the added value. Therefore, as the period T varies by the update, the period of the control signal 312, 314 varies.

The address counter 46 generates the write address signal 316 that specifies each clock sequentially, for example, address 0 to address N, when the control signal 312 from the judgment circuit 44 is "1". Therefore, the address N varies as a rule in accordance with the length of the period T of the control signal 312. For example, if the period T of the control signal 312 becomes long, the address N will become large, and the number of the addresses that the write address signal 316 specifies will increase. In reverse, if the period T of the control signal 312 becomes short, the address N will become small, and the number of the addresses that the write address signal 316 specifies will decrease. This is the same with the read address signal 318.

The address counter 48 generates, in the same manner as the address counter 46, the read address signal 318 that specifies address 0 to address N each clock sequentially, on the basis of the control signal 314 from the judgment circuit 44. However, the timing of the address signal 318 is delayed by T0 clock from the address signal 316. Thereby, the data written in the memory 40 is read before the writing of the data is executed. The address signals 316, 318 are supplied to the memory 40. The memory 40 writes the input data 300 in address 0 to address N sequentially in accordance with the write address signal 316. The memory 40 reads the written data sequentially in accordance with the read address signal 318, and outputs the read data as the output data 306.

Figure 7:
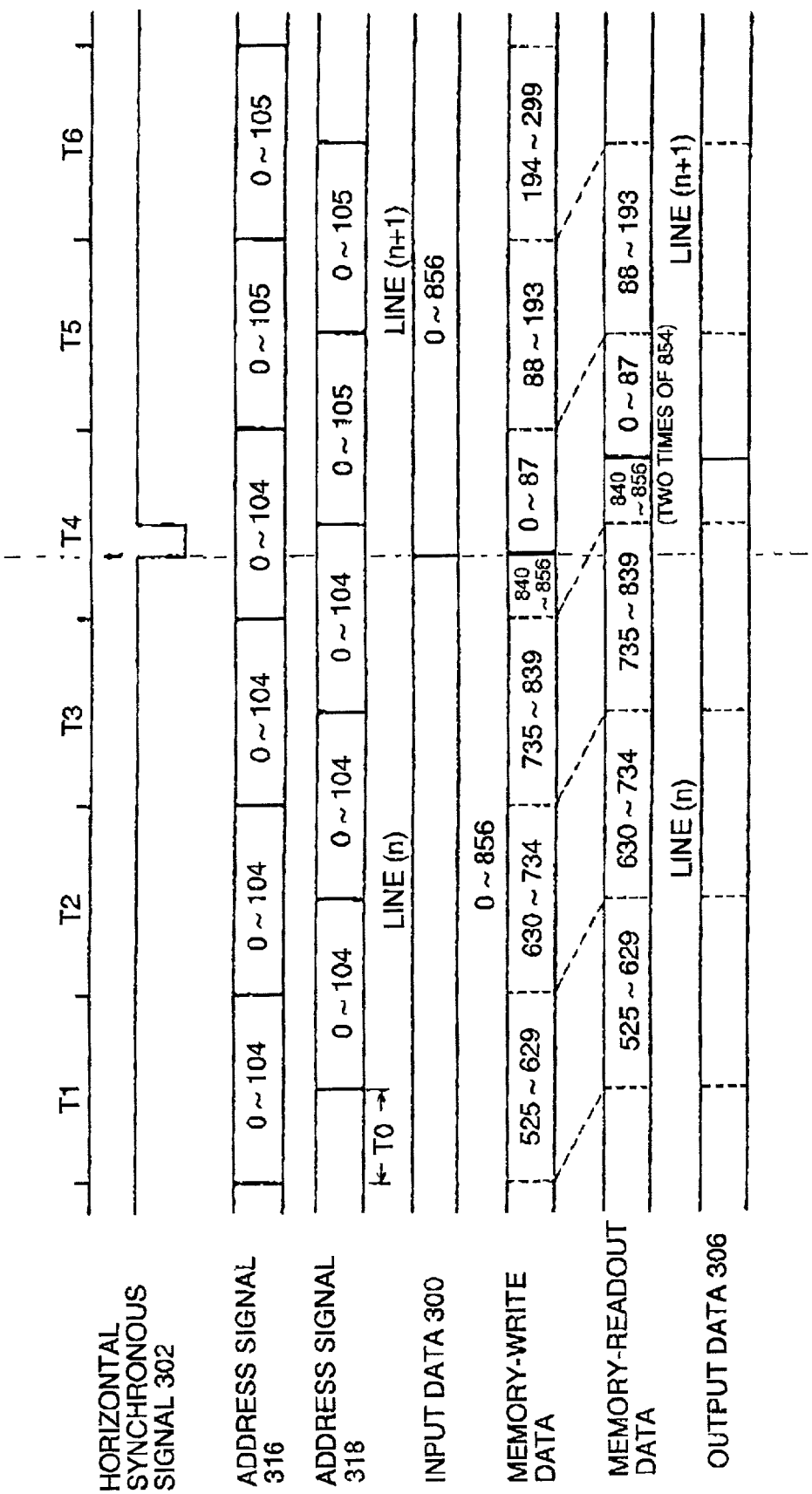
FIG. 7 is a timing chart to illustrate the operation in the video signal control circuit in FIG. 6.

As shown in FIG. 7, for example, when the write address signal 316 sequentially designates addresses 0~104 in the periods T1, T2, T3, T4, and the read address signal 318 designates addresses 0~104 with a delay T0 (52 clocks) from the write address signal 316, during the periods T1, T2, T3, T4 of the input data 300, the 105 data are sequentially written in addresses 0~104 of the memory 40. The written data are sequentially read after T0. The line (n) of the input data 300 is assumed to be composed of data 0~856 (857 pixels).

However, when the horizontal synchronous signal 302 is inputted at time t in the period T4, the judgment circuit 44 subtracts the pixel number of the line (n) counted by the counter 42 from the standard pixel number to calculate the difference. The judgment circuit 44 controls the period T of the control signals 312, 314 on the basis of the difference calculated. In this case, since the difference is +1, the period T of the control signals 312, 314 is elongated by one clock from the next period. Thereby, in the address counters 46, 48 are generated the address signals 316, 318 that sequentially specify addresses 0~105, which are supplied to the memories 40.

However, the address counter 48 supplies, when supplied with the horizontal synchronous signal 302 at time t, the address counter 48 with the address X=16 that the read address signal 318 at that moment indicates. When supplied with the address X by the address counter 48, the address counter 48 is supplied with the difference signal 310 indicating +1 by the judgment circuit 44. Accordingly, when generating the read address signal 318 that reads the data written during the period T4, at the moment of generating the address Y(X), the address counter 48 generates the address Y consecutively one more time, and the addresses sequentially from the address (Y+1) and after. In FIG. 7, Y is set at (X−2). Thereby, the repetition and deletion of data can be performed in the blanking period.

Therefore, out of data 840~856 of the line (n) and data 0~87 of the line (n+1) that have been written in the memory 40 during the period T4 shown in FIG. 7, data 854 of the address Y=14 is read out twice. Consequently, the pixel number (number of data) of the line (n) is increased by one pixel, and regulated into the standard pixel number 858. Thus, the data written during the period T4 in the memory 40 are all read out and one of them is repeatedly read (read twice). Accordingly, the readout period corresponding to the period T4 is set longer by one address, and the period of that length continues thereafter. When the line whose pixel number is smaller than the standard pixel number is repeatedly inputted thereafter, the number of data written in the memory 40 increases gradually. Accompanied with this increase, the delay T0 of the timing at which the data are read from the memory 40 increases gradually.

In the example of FIG. 7, the line whose pixel number per one line is smaller than the standard pixel number is inputted. When the line whose pixel number per one line is larger than the standard pixel number is inputted, the data are read from the memory 40 with the data of part of the addresses deleted, thus regulating the pixel number into the standard. When the line having a larger pixel number is continuously inputted, the number of data that are written in the memory 40 decreases gradually. Accompanied with this decrease, the delay T0 of the timing at which the data are read from the memory 40 decreases gradually. Further, the address counters 46, 48 are initialized each field by the vertical synchronous signal 320. Accompanied with this initialization, the address supplied to the memory 40 is returned each field to the initial set value.

Thus, according to the third embodiment, even when the pixel number per one line is dispersed from the standard pixel number, the pixel number can be regulated to be equal to the standard pixel number, so that the data of the constant period can be outputted. Further, since the one two-port memory is employed instead of the two one-port memories in the second embodiment, the control system such as the address counter and the judgment circuit, etc., can be simplified. Consequently, the number of the circuit elements can be reduced, the chip size when integrating the circuits into an LSI can be reduced, and the lower power consumption can be achieved.

Incidentally, the pixel dispersion can be regulated up to the total number n/2 in the first embodiment, which is limited by the number n of the FF stages in the FF circuit 10. However, with regard to the pixel dispersion in the non-standard signal, though it can be created at random, a line with a smaller pixel number than the standard pixel number, or a line with a larger pixel number than the standard continues frequently in most cases. The fourth embodiment focuses on this point, which provides a video signal control circuit that selects the data initially selected by the selector 16 so as to follow the inclination of the pixel dispersion to thereby absorb double the pixel dispersion by the same number of the FF stages.

Figure 8:
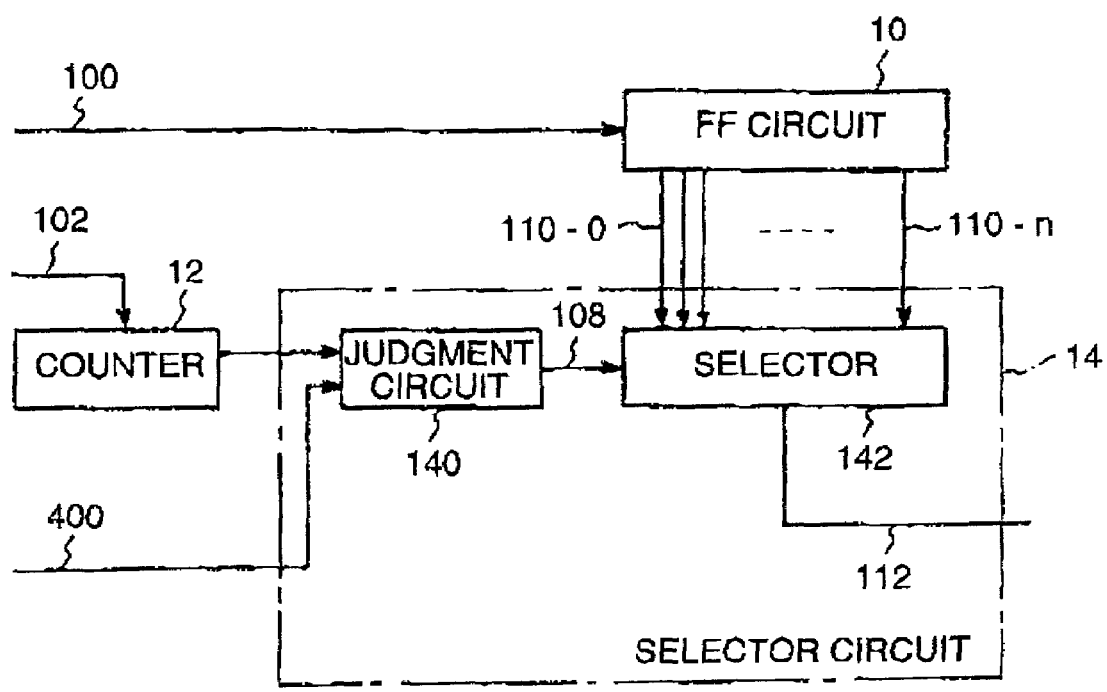
FIG. 8 is a block diagram of a video signal control circuit in the fourth embodiment of the invention.

FIG. 8 is a block diagram that illustrates the fourth embodiment. In FIG. 8, the FF 10, counter 12, and selector 14 are the same ones as those with the same symbols attached in FIG. 1. However, the judgment circuit 140 of the selector circuit 14 is provided with a control terminal that accepts a selection signal 400 to designate an initial delay from outside, and the control terminal is connected to the register B of the judgment circuit 140. Here in FIG. 8, the vertical synchronous signal inputted to the selector 142 is omitted.

When the selection signal 400 is inputted to the control terminal before the start of operation, the selection signal 400 is inputted to the register B of the judgment circuit 140. The register B preferentially holds the initial delay that the selection signal 400 designates. Thus, the initial delay is initialized in the register B. The selector 142 selects the data having the delay corresponding to the initial delay that was initialized at the start of operation out of the data 110-0~110-n inputted by the FF circuit 10, and outputs the result.

When a line having the pixel number per one line smaller than the standard pixel number is continuously inputted, the selection signal 400 designates the value of the initial delay, for example, 0. And, When a line having the pixel number per one line larger than the standard is continuously inputted, the selection signal 400 designates the value of the initial delay, for example, n. When the line having the pixel number per one line smaller than the standard is continuously inputted, the delay of the data selected is gradually increased. When the line having the pixel number per one line larger than the standard is continuously inputted, the delay of the data selected is gradually decreased. With the initial delay thus set, more pixel dispersions will be absorbed.

Thus, the fourth embodiment makes it possible to initialize an initial delay corresponding to the inclination of the pixel dispersion by means of the selection signal 400. Accordingly, the fourth embodiment makes it possible to absorb more pixel dispersions than the first embodiment. Further, since the fourth embodiment absorbs a same number of pixel dispersions with fewer FF stages than the first embodiment, the circuit scale can be reduced, and the power consumption can be lowered.

In the fourth embodiment, the delay held in the register B of the judgment circuit 140 is initialized. Similarly, the second embodiment and the third embodiment can achieve the same effect as the fourth embodiment, by initializing the period (number of addresses) held in the registers 304, 444 of the judgment circuits 30, 44 in the second and third embodiments.

Incidentally, in the above fourth embodiment, it is necessary to determine the initial delay that the selection signal 400 designates at an optimum value, in compliance with the inclination of the pixel dispersion. However, when the inclination of the pixel dispersion is judged manually, there can be a misjudgment, or a mis-input. In such a case, there will be a possibility that the pixel dispersion cannot be absorbed, or that the number of the pixel dispersion to be absorbed becomes extremely small. In order to solve such a problem, in addition to the fourth embodiment, the fifth embodiment is provided with an initial value judgment circuit 50 which automatically judges the inclination of the pixel dispersion, whereby the t selection signal 400 is generated.

Figure 9:
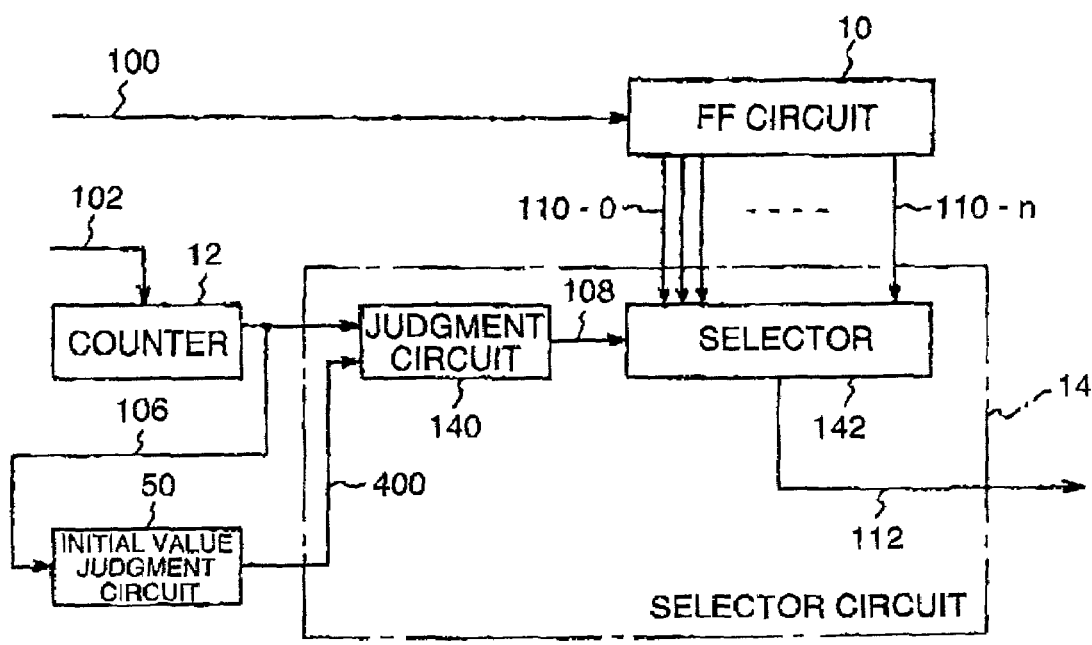
FIG. 9 is a block diagram of a video signal control circuit in the fifth embodiment of the invention.

FIG. 9 is a block diagram that illustrates the fifth embodiment. In FIG. 9, the FF 10, counter 12, and judgment circuit 14 are the same ones as those with the same symbols attached in FIG. 8. However, the counter 12 has the initial value judgment circuit 50 connected, and the output of the initial value judgment circuit 50 is connected to the control terminal of the selector circuit 14. Here in FIG. 9, the vertical synchronous signal inputted to the selector 142 is omitted.

Figure 10:
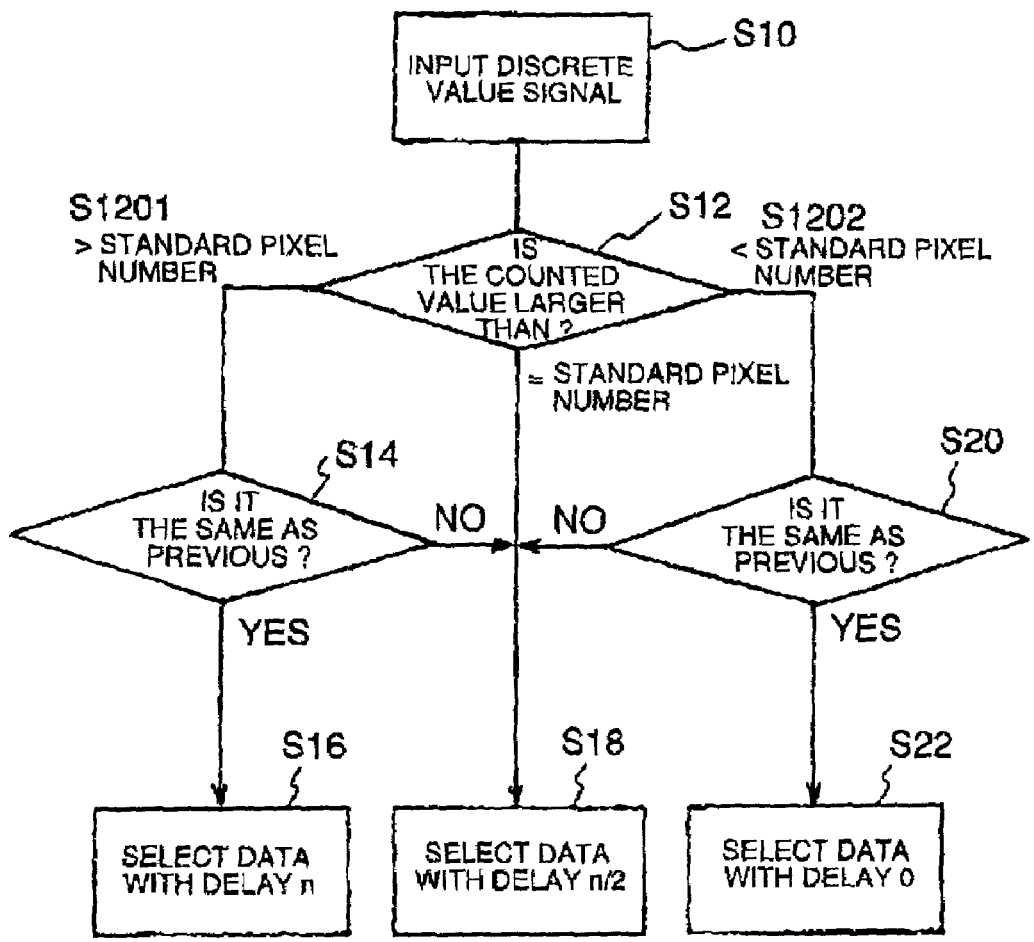
FIG. 10 is a timing chart to illustrate the operation in the video signal control circuit in FIG. 9.

As shown in FIG. 10, for example, when the discrete value signal 106 is supplied by the counter 12 (step S10 in FIG. 10), the initial value judgment circuit 50 compares the counted value (pixel number per one line) that the discrete value signal 106 indicates with the standard pixel number (step S12). And, if the counted value is larger than the standard pixel number, the processing advances to step S14. If the counted value is equal to the standard, the processing advances to step S18. If the counted value is smaller than the standard, the processing advances to step S20.

At step S14, whether or not a line having a pixel number larger than the standard continues is judged. If the judgment shows that it continues, the processing advances to step S16, and if not, the processing advances to step S18. At step S16, the selection signal 400 that designates the initial delay n is generated. Thereby, the selector 142 selects the data 110-$n$ having the delay n at the start of operation. Further, the number by which a line having a pixel number larger than the standard pixel number continues may be larger than 2 (for example, 10 lines), and the continuing line number may be variable (same in step S22).

At step S18, the selection signal 400 that designates the initial delay n/2 is generated. Thereby, the selector 142 selects the data 110-($n$/2) having the delay n/2 at the start of operation. And, at step S20, whether or not a line having a pixel number smaller than the standard continues is judged. If the judgment shows that it continues, the processing advances to step S22, and if not, the processing advances to step S18. At step S22, the selection signal 400 that designates the initial delay 0 is generated. Thereby, the selector 142 selects the data 110-0 having the delay 0 at the start of operation. The judgment circuit 140 of the selector circuit 14 initializes the delay to be held in the register B in accordance with the designation of the selection signal 400 generated by the initial value judgment circuit 50.

Thus, according to the fifth embodiment, the initial value judgment circuit 50 checks plural lines of which pixel numbers are continuously inputted, and judges the inclination of the pixel dispersion. And, the data to be selected is determined at the start of operation so as to absorb the pixel dispersion to the maximum in accordance with the inclination of the pixel dispersion. Thus, the fifth embodiment eliminates manual determining operations, which is troublesome, and avoids the errors on determination.

Thus, the fifth embodiment is provided with the initial value judgment circuit 50 to generate the selection signal 400 that initializes the delay held in the register B of the judgment circuit 140. Also, in the second embodiment and the third embodiment, the similar effect to the fifth embodiment can be achieved by employing the foregoing initial value judgment circuit 50 to generate the selection signal 400 that initializes the period (number of addresses) held in the registers 304, 444 of the judgment circuits 30, 44.

According to the invention thus described, since plural data whose delays are different each other for one clock (for one pixel) are generated from an input signal by means of flip-flop circuits, and a data of the delay according to the pixel number per one line is selected out of the plural data, the pixel number per one line can be regulated into a constant, and the data of the constant period can be outputted.

Further according to the invention, since an input data is alternately written in the two one-port memories, and the written data are read alternately at the timing corresponding to the pixel number per one line, the pixel number per one line can be regulated into a constant, and the data of the constant period can be outputted. Further, in comparison to the case using the flip-flop circuits, the number of the circuit elements can be reduced, and the lower power consumption can be achieved.

Further, according to the invention, since one two-port memory is employed instead of the two one-port memories to sequentially write an input data in the one two-port memory, and the written data are read out at the timing corresponding to the pixel number per one line, the pixel number per one line can be regulated into a constant, and the data of the constant period can be outputted. Further, since the control circuit system is simplified, the number of the circuit elements can be reduced, and the lower power consumption can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video signal control circuit receiving a video signal including a plurality of lines each of which nominally includes a standard number of pixels as an input data, the video signal control circuit comprising:
    a delay circuit delaying the input data with a plurality of delay times so that the delay circuit outputs a plurality of delayed input data;
    a counter circuit that counts a pixel number of each line in the input data; and
    a judgment circuit that calculates a difference between the standard number and the pixel number counted by the counter circuit, and outputs a calculated difference signal; and
    a selector combining the delayed input data in response to the calculated difference signal to generate as an output data, combined input data having the standard number of pixels.

2. A video signal control circuit as claimed in claim 1, wherein the delay circuit includes a plurality of flip-flop circuits converting the input data into the delayed input data with each delayed by one clock.

3. A video signal control circuit as claimed in claim 1, wherein the judgment circuit is able to set an initial value of the delay to the delay circuit in accordance with a selection signal.

4. A video signal control circuit as claimed in claim 3, further comprising an initial value judgment circuit that judges an inclination of a pixel dispersion on the basis of the pixel number counted by the counter circuit, and outputs the selection signal that designates an initial delay in accordance with the inclination of the pixel dispersion.

5. A video signal control circuit receiving a video signal including a plurality of lines each of which nominally includes a standard number of pixels as an input data, the video signal control circuit comprising:
    a memory circuit which the input data can be written in and read from, which includes two one-port memories, wherein the input data are alternately written in the two one-port memories, and the written input data are alternately read from the two one-port memories;

an address generation circuit that outputs a write address or a read address to the memory circuit;

a counter circuit that counts a pixel number of each line in the input data;

a judgment circuit that calculates a difference between the standard pixel number and the pixel number counted by the counter circuit, and calculates a new address value in accordance with an address value generated by the address generation circuit and the calculated difference; and an output selector combining the input data read from the memory circuit based on the new address to generate as an output data, combined input data having the standard number of pixels.

6. A video signal control circuit that processes a video signal of which one line is composed of plural pixels as an input data, comprising:

a memory circuit including a two-port memory that is able to write in and read out the input data in parallel;

an address generation circuit that outputs a write address or a read address to the memory circuit;

a counter circuit that counts a pixel number of each line in the input data; and a judgment circuit that calculates a difference between a set standard pixel number and the pixel number counted by the counter circuit, and calculates a new address value in accordance with an address value generated by the address generation circuit and a delay signal on the basis of the calculated difference;

wherein the address generation circuit generates the write address or the read address on the basis of the address value and the delay signal calculated by the judgment circuit, and when there is a difference between the pixel number of the input data read from the memory circuit and that of the input data written in the memory circuit, some of the plural read addresses each corresponding to the plural data to be read are repeated or deleted, in accordance with the difference between the pixel numbers, the input data read from the memory circuit according to the plural read addresses constituting an output data of the video signal control circuit.

7. A video signal control circuit as claimed in claim 5, wherein the judgment circuit is able to set an initial value of the address generated by the address generation circuit in accordance with a selection signal.

8. A video signal control circuit as claimed in claim 7, further comprising an initial value judgment circuit that judges an inclination of a pixel dispersion on the basis of the pixel number counted by the counter circuit, and outputs the selection signal that designates an initial value of the address in accordance with the inclination of the pixel dispersion.

9. A video signal control circuit as claimed in claim 6, wherein the judgment circuit is able to set an initial value of the address generated by the address generation circuit in accordance with a selection signal.

10. A video signal control circuit as claimed in claim 9, further comprising an initial value judgment circuit that judges an inclination of a pixel dispersion on the basis of the pixel number counted by the counter circuit, and outputs the selection signal that designates an initial value of the address in accordance with the inclination of the pixel dispersion.

11. A video signal control circuit as claimed in claim 5, wherein the address generating circuit includes a plurality of address counters.

12. A video signal control circuit as claimed in claim 6, wherein the address generating circuit includes a plurality of address counters.

13. A video signal control circuit as claimed in claim 1, wherein the counter circuit counts the pixel number of each line in the input data in response to a horizontal synchronous signal received by the counter circuit.

14. A video signal control circuit as claimed in claim 5, wherein the counter circuit counts the pixel number of each line in the input data in response to a horizontal synchronous signal received by the counter circuit.

15. A video signal control circuit as claimed in claim 6, wherein the counter circuit counts the pixel number of each line in the input data in response to a horizontal synchronous signal received by the counter circuit.

* * * * *